United States Patent
Li et al.

(10) Patent No.: US 7,960,057 B2
(45) Date of Patent: Jun. 14, 2011

(54) BATTERY WITH MOLTEN SALT ELECTROLYTE AND PHOSPHORUS-CONTAINING CATHODE

(75) Inventors: Wen Li, Ann Arbor, MI (US); Keiichi Kohama, Shizuoka (JP); Michel B. Armand, Saint Martin D'uriage (FR); Gerald Perron, Boucherville (CA)

(73) Assignees: Toyota Motor Engineering & Manufacturing North America, Inc., Erlanger, KY (US); Toyota Motor Corporation, Toyota (JP); Centre National de la Recherche Scientifique, Paris (FR); University de Montreal, Montreal (CA)

( * ) Notice: Subject to any disclaimer, the term of this patent is extended or adjusted under 35 U.S.C. 154(b) by 0 days.

(21) Appl. No.: 11/130,467

(22) Filed: May 16, 2005

(65) Prior Publication Data
US 2007/0003833 A1     Jan. 4, 2007

Related U.S. Application Data

(60) Provisional application No. 60/571,777, filed on May 17, 2004.

(51) Int. Cl.
*H01M 4/58* (2010.01)
(52) U.S. Cl. ............... 429/218.1; 429/231.95
(58) Field of Classification Search .......... None
See application file for complete search history.

(56) References Cited

U.S. PATENT DOCUMENTS

| | | | |
|---|---|---|---|
| 3,736,184 A | 5/1973 | Dey et al. | |
| 4,360,574 A * | 11/1982 | Park | 429/94 |
| 4,463,071 A | 7/1984 | Gifford et al. | |
| 5,470,669 A | 11/1995 | Ludwig et al. | |
| 5,538,814 A * | 7/1996 | Kamauchi et al. | 429/303 |
| 5,552,241 A | 9/1996 | Mamantov et al. | |
| 5,589,291 A | 12/1996 | Carlin et al. | |
| 5,871,866 A | 2/1999 | Barker et al. | |
| 6,168,885 B1 | 1/2001 | Narang et al. | |
| 6,183,911 B1 * | 2/2001 | Kweon et al. | 429/224 |
| 6,203,946 B1 | 3/2001 | Barker et al. | |
| 6,245,847 B1 * | 6/2001 | Green et al. | 524/418 |

(Continued)

FOREIGN PATENT DOCUMENTS
WO    WO 00/31812    2/2000

OTHER PUBLICATIONS

Dueber, Dr. Ross; "Sliver-Zinc Battery Teech Outshines Li-Ion on Safety Front"; ZPower, Cots Journal, www.zpowerbattery.com; pp. 1-5., Published in 2009.

(Continued)

*Primary Examiner* — Dah-Wei D Yuan
*Assistant Examiner* — Adam A Arciero
(74) *Attorney, Agent, or Firm* — Gifford, Krass, Sprinkle, Anderson & Citkowski, P.C.

(57) ABSTRACT

A lithium-ion battery comprises a negative electrode, a positive electrode, and an electrolyte including a molten salt. The positive electrode comprises an electroactive compound including phosphorus, oxygen, lithium, and at least one other metal or semi-metal. The combination of such electrode compositions and a molten salt electrolyte provides a battery with very high thermal stability. Other ions, such as alkal metal ions, may be used in place of lithium ions for applications in other battery technologies.

5 Claims, 3 Drawing Sheets

U.S. PATENT DOCUMENTS

| | | |
|---|---|---|
| 6,319,632 B1 | 11/2001 | Amine |
| 6,326,104 B1 | 12/2001 | Caja et al. |
| 6,365,301 B1 * | 4/2002 | Michot et al. ............... 429/307 |
| 6,447,951 B1 | 9/2002 | Barker et al. |
| 6,528,033 B1 * | 3/2003 | Barker et al. ............... 423/306 |
| 6,544,691 B1 * | 4/2003 | Guidotti ............... 429/344 |
| 6,645,452 B1 * | 11/2003 | Barker et al. ............... 423/306 |
| 6,702,961 B2 | 3/2004 | Barker et al. |
| 6,716,372 B2 | 4/2004 | Barker et al. |
| 6,720,110 B2 | 4/2004 | Barker et al. |
| 6,723,470 B2 | 4/2004 | Barker et al. |
| 6,730,281 B2 | 5/2004 | Barker et al. |
| 6,783,890 B2 * | 8/2004 | Kweon et al. ............... 429/218.1 |
| 6,815,122 B2 | 11/2004 | Barker et al. |
| 2005/0064282 A1 * | 3/2005 | Inagaki et al. ............... 429/163 |
| 2005/0069777 A1 * | 3/2005 | Takami et al. ............... 429/245 |

OTHER PUBLICATIONS

Zhou, Dai-Ying et al., "Performance of electrolyte with dimethyl methyl phosphonate as flame-retardant additive"; Science Press; Trans. Nonferrous Met. Soc. China 17(2007) pp. 923-927.

* cited by examiner

BATTERY WITH MOLTEN SALT ELECTROLYTE AND PHOSPHORUS-CONTAINING CATHODE

REFERENCE TO RELATED APPLICATION

This application claims priority of U.S. Provisional Patent Application Ser. No. 60/571,777, filed May 17, 2004, the entire content of which is incorporated herein by reference.

FIELD OF THE INVENTION

The present invention relates to batteries, in particular to batteries having a molten salt electrolyte.

BACKGROUND OF THE INVENTION

Safety is a key issue for lithium-ion (Li-ion) battery applications. Conventional organic electrolytes have high vapor pressures, and are flammable. In contrast, molten salt electrolytes have high melting points and low vapor pressures, therefore they provide higher safety levels than organic electrolytes.

However, conventional cathode electroactive materials used in a Li-ion battery, such as $LiCoO_2$ and $LiNiO_2$ based cathodes (positive electrodes), have cost and thermal stability problems, even in a Li-ion battery with molten salt electrolyte. In order to further improve the performance of Li-ion batteries with a molten salt electrolyte, it is necessary to find other cathode materials with high thermal stability.

SUMMARY OF THE INVENTION

A battery comprises a positive electrode, a negative electrode, and an electrolyte including a molten salt. The positive electrode includes a positive electroactive material that is a compound of a first species, phosphorus, oxygen, and one or more metals or semi-metals other than the first species. For example, the first species may be lithium, and the battery a molten-salt lithium-ion battery. Cations of the first species (such as lithium ions) are inserted into and withdrawn from the electroactive material during operation of the battery.

The positive electroactive material can be represented by the formula $Li_xM_y(PO_4)_z$, where $1 \leq x \leq 3$, $1 \leq y \leq 3$, and $1 \leq z \leq 3$, where M represents one or more metals other than Li. The material can be a phosphate of lithium and at least one other metal, such as a transition metal, such as a lithium iron phosphate. The phosphate may also be fluorinated or otherwise halogenated, for example having a formula $Li_xM_y(PO_4)_zF$. M may be chosen from the group consisting of Mg, Al, Ti, V, Cr, Mn, Fe, Co, Ni, Cu, Zn, Ga, Ge, Zr, Nb, Mo, Ag, In, Sn, Sb, La, Ce, W, and Au. In other battery technologies, Li may be replaced with another cation-forming species.

DETAILED DESCRIPTION OF THE INVENTION

Figure 1:
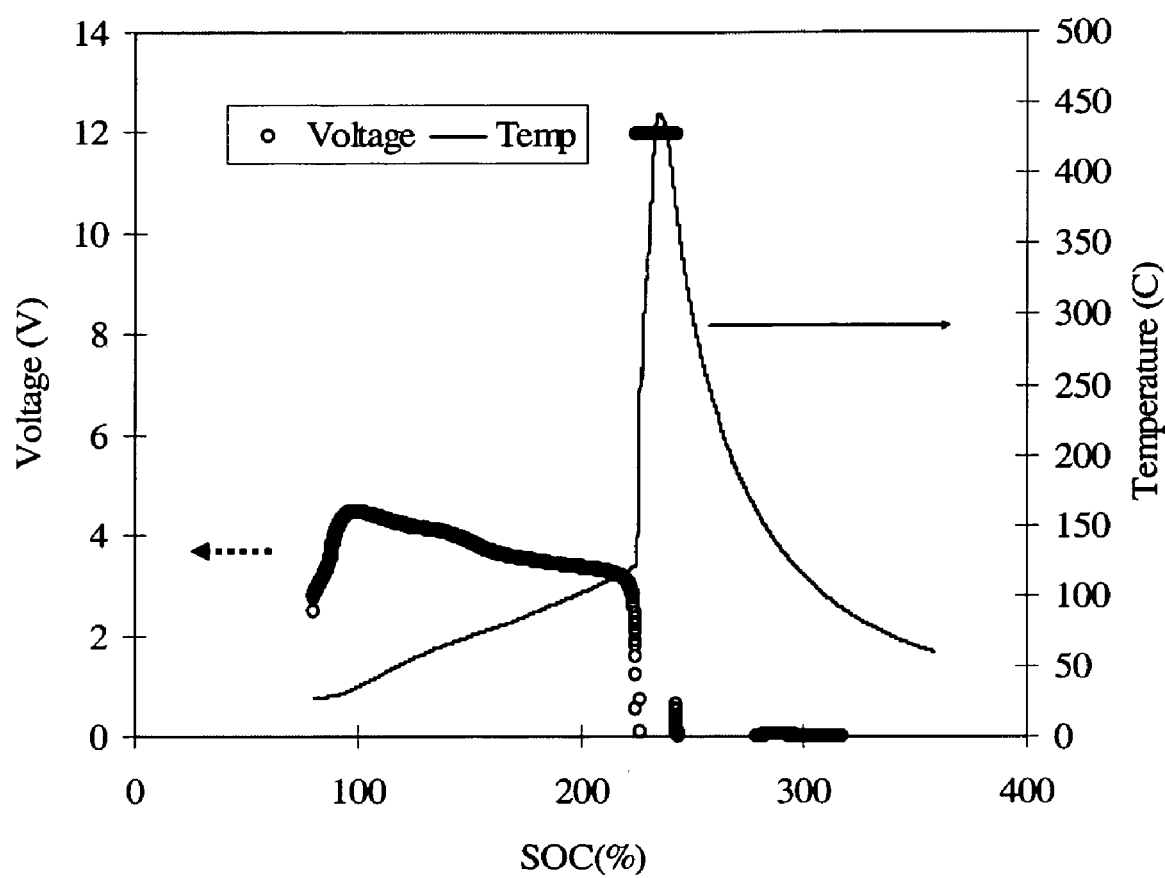
FIG. 1 shows an overcharge test result for a lithium-ion battery having a conventional $LiNiO_2$ cathode (positive electrode) and a molten salt electrolyte, the test showing the instability of the cathode material.

Batteries according to examples of the present invention include a lithium-ion (Li-ion) battery having a molten salt electrolyte and a cathode (used herein to describe the positive electrode) including an electroactive compound including lithium, at least one metal other than lithium, phosphorus, and oxygen, such as a lithium metal phosphate.

In a lithium-ion battery and similar rechargeable batteries, the term anode is conventionally used for the negative electrode, and the term cathode is conventionally used for the positive electrode. These designations are technically correct only for the battery in a discharge cycle, however these designations are widely used in the literature and are used herein. The term battery is used to refer to a device including one or more electrochemical cells.

An example lithium-ion battery includes an anode (negative electrode), a cathode (positive electrode), and a molten salt electrolyte, the cathode comprising a cathode electroactive material that is a compound of lithium, another metal, phosphorus, and oxygen. An example of such a compound is a lithium metal phosphate comprising lithium, at least one other metal, phosphorus, and oxygen. Lithium-ion batteries according to examples of the present invention can have improved thermal stability and decreased cost, compared with a conventional Li-ion battery.

In examples of the present invention, the battery is a lithium-ion battery, and the cathode (positive electrode) includes a positive electroactive material (also referred to as a cathode electroactive material) such as a material represented by the formula $Li_xM_y(PO4)_z$, where $1 \leq x \leq 3$, $1 \leq y \leq 3$, and $1 \leq z \leq 3$. M may represent one or more atomic species, which may include transition metals, alkaline earth metals, other metals, and/or semi-metals. For example, M may represent one or more elements chosen from the group consisting of Mg, Al, Ti, V, Cr, Mn, Fe, Co, Ni, Cu, Zn, Ga, Ge, Zr, Nb, Mo, Ag, In, Sn, Sb, La (and other lanthanoids such as Ce), W, and Au. M may represent at least one metal selected from the group of metals consisting of alkaline earth metals, transition metals, group 13 metals, and group 14 metals. In other examples, M may also represent one or more semi-metals (such as boron, silicon, germanium, arsenic, antimony, or tellurium), possibly in combination with other metals.

The cathode electroactive material may also be a fluorinated lithium metal phosphate such as $Li_2CoPO_4F$. Fluorinated lithium metal phosphates include fluorinated phosphates of lithium and one or more transition metals, other metals, or semi-metals, including fluorinated phosphates of lithium and one or more metals selected from the group consisting of Mg, Al, Ti, V, Cr, Mn, Fe, Co, Ni, Cu, Zn, Ga, Ge, Zr, Nb, Mo, Ag, In, Sn, Sb, La (and other lanthanoids such as Ce), W, and Au.

The cathode electroactive material may by nanostructured, for example in the form of nanoparticles having a mean diameter less than one micron.

Lithium based phosphates are described in Int. Pat. Pub. No. WO0031812A, and metal phosphate and metal arsenate organic electrolyte batteries are described in U.S. Pat. No. 3,736,184. Materials described in these publications can be used in examples of the present invention.

Hence, an improved secondary battery (rechargeable battery), such as a lithium-ion battery, includes an anode, a molten salt electrolyte, and a cathode, the cathode including an electroactive phosphate material having the formula $A_xM_y(PO_4)_z$. In examples of the present invention, the electroactive phosphate material is an ion insertion compound, insertable by the ionic form of the A species. The symbol A may represent an alkali metal (such as lithium, sodium, potassium, or cesium), an alkaline earth metal (such as calcium), other metal atom, or other species, the cation of which is insertable into the electroactive material. For example, A may represent an organic species, for example in a rechargeable battery based on organic ion insertion into an electroactive material. M can represent one or more metal atoms, semi-metal atoms, or other species other than the species A. The electroactive phosphate material may also be halogenated, such as fluorinated, for example having the formula $A_xM_y(PO_4)_zF$.

The positive electroactive material may be present in the cathode in the form of nanoparticles, for example particles having a mean diameter less than 1 micron. Other electrode structures may also be used, such as an electroactive coating on electrically conducting particles, or any electrode structure known in the art.

Batteries according to examples of the present invention have a molten salt electrolyte. The term molten salt electrolyte is used herein to represent an electrolyte including one or more molten salts as a significant component of the electrolyte, for example more than 30% of the electrolyte. A molten salt electrolyte is an electrolyte comprising one or more salts, that is at least in part molten (or otherwise liquid) at the operating temperatures of the battery. A molten salt electrolyte can also be described as a molten, non-aqueous electrolyte, as an aqueous solvent is not required, or as an ionic liquid.

Molten salt electrolytes which may be used in embodiments of the invention are described in U.S. Pat. No. 4,463,071 to Gifford; U.S. Pat. No. 5,552,241 to Mamantov et al.; U.S. Pat. No. 5,589,291 to Carlin et al.; U.S. Pat. No. 6,326,104 to Caja et al.; U.S. Pat. No. 6,365,301 to Michot, and U.S. Pat. No. 6,544,691 to Guidotti.

Example molten salts include those having an aromatic cation (such as an imidazolium salt or a pyridinium salt), an aliphatic quaternary ammonium salt, or a sulfonium salt. The molten salt electrolyte in the invention may include an onium, such as an ammonium, a phosphonium, an oxonium, a sulfonium, an amidinium, an imidazolium, a pyrazolium, and an anion, such as $PF_6^-$, $BF_4^-$, $CF_3SO_3^-$, $(CF_3SO_2)_2N^-$, $(FSO_2)_2N^-$, $(C_2F_5SO_2)_2N^-$, $Cl^-$ and $Br^-$.

A molten salt electrolyte used in an example of the present invention may also include $Y^+N^-(-SO_2Rf^2)(-XRf^3)$, where $Y^+$ is a cation selected from the group consisting of an imidazolium ion, an ammonium ion, a sulfonium ion, a pyridinium, a(n) (iso)thiazolyl ion, and a(n) (iso)oxazolium ion, which may be optionally substituted with $C_{1-10}$ alkyl or $C_{1-10}$ alkyl having ether linkage, provided that said cation has at least one substituent of $-CH_2Rf^1$ or $-OCH_2Rf^1$ (where $R^{f1}$ is $C_{1-10}$ polyfluoroalkyl); $Rf^2$ and $Rf^3$ are independently $C_{1-10}$ perfluorophenyl or may together from $C_{1-10}$ perfluoroalkylene; and X is $-SO_2-$ or $-CO-$.

Molten salts include salts having an aromatic cation (such as an imidazolium salt or a pyridinium salt), aliphatic quaternary ammonium salts, and sulfonium salts.

Imidazolium salts include salts having a dialkylimidazolium ion, such as a dimethylimidazolium ion, an ethylmethylimidazolium ion, a propylmethylimidazolium ion, a butylmethylimidazolium ion, a hexylmethylimidazolium ion or an octylmethylimidazolium ion, or a trialkylimidazolium ion such as a 1,2,3-trimethylimidazolium ion, a 1-ethyl-2,3-dimethylimidazolium ion, a 1-butyl-2,3-dimethylimimdazolium ion or a 1-hexyl-2,3-dimethylimidazolium ion. Imidazolium salts include ethylmethylimidazolium tetrafluoroborate (EMI-BF$_4$), ethylmethylimidazolium trifluoromethanesulfonylimide (EMI-TFSI), propylmethylimidazolium tetrafluoroborate, 1,2-diethyl-3-methylimidazolium trifluoromethanesulfonylimide (DEMI-TFSI), and 1,2,4-triethyl-3-methylimidazolium trifluoromethanesulfonylimide (TEMI-TFSI).

Pyridinium salts include salts having an alkyl pyridinium ion, such as a 1-ethylpyridinium ion, a 1-butylpyridinium ion or a 1-hexylpyridinium ion. Pyridinium salts include 1-ethylpyridinium tetrafluoroborate and 1-ethylpyridinium trifluoromethanesulfonylimide.

Ammonium salts include trimethylpropylammonium trifluoromethanesulfonylimide (TMPA-TFSI), diethylmethylpropylammonium trifluoromethanesulfonylimide, and 1-butyl-1-methylpyrrolidinium trifluoromethanesulfonylimide. Sulfonium salts include triethylsulfonium trifluoromethanesulfonylimide (TES-TFSI).

In a secondary battery operating through the migration of cations, the electrolyte typically contains a cation source, providing cations according to the type of battery. In the case of a lithium-ion battery, the cation source can be a lithium salt. Lithium salts in the electrolyte of a lithium-ion battery may include one or more of the following: $LiPF_6$, $LiAsF_6$, $LiSbF_6$, $LiBF_4$, $LiClO_4$, $LiCF_3SO_3$, $Li(CF_3SO_2)_2N$, $Li(C_2F_5SO_2)_2N$, $LiC_4F_9SO_3$, $Li(CF_3SO_2)_3C$, $LiBPh_4$, $LiBOB$, and $Li(CF_3SO_2)(CF_3CO)N$. Examples of the present invention can include rechargeable batteries using ions other than lithium, such as other alkali metal or other cation based batteries, in which case an appropriate salt is used. For example, the molten salt of a potassium-ion battery may include $KPF_6$ or other potassium-ion providing compound.

An example lithium-ion battery according to the present invention comprises an anode, a cathode, and an electrolyte. The cathode (positive electrode) includes a phosphorus containing compound as a cathode electroactive material. For example, the cathode electroactive material may be compound of lithium, one or more other metal species (such as one or more other transition metal species), phosphorus, and oxygen. The phosphorus containing compound can be a phosphate, such as lithium iron phosphate.

In examples of the present invention, the cathode electroactive material allows ion insertion and extraction, so that the inserted ion content of the electroactive material varies with the state of charge of the battery. Hence, x varies with state of charge in a representative formula such as $Li_xM_y(PO_4)_z$. The cathode may further include an electron conductive material, a binder, or other components chosen to give desired electrical or mechanical properties. The cathode may be formed in electrical communication with a cathode electron collector.

The anode (negative electrode) can comprise an anode electroactive material, and (optionally) an electron conductive material and a binder. The anode may be formed in electrical communication with an anode electron collector. The anode electroactive material may be carbon based, such as graphitic carbon and/or amorphous carbon, such as natural graphite, mesocarbon microbeads (MCMBs), highly ordered pyrolytic graphite (HOPG), hard carbon or soft carbon, or a material comprising silicon and/or tin, or other components. The negative electrode may be a lithium titanate, such as $Li_4Ti_5O_{12}$.

Rechargeable batteries according to examples of the present invention include those based on any cation that can be reversibly stored (for example, inserted or intercalated)

and released. Cations may include positive ions of alkali metals such as lithium, sodium, potassium, and cesium; alkaline earth metals such as calcium and barium; other metals such as magnesium, aluminum, silver and zinc; and hydrogen. In other examples, cations may be ammonium ions, imidazolium ions, pyridinium ions, phosphonium ions, sulfonium ions, and derivatives thereof, such as alkyl or other derivatives of such ions.

Electron conductive materials which may be used in anodes or cathodes of batteries according to examples of the present invention may comprise a carbon-containing material, such as graphite. Other example electron-conductive materials include polyaniline or other conducting polymer, carbon fibers, carbon black (or similar materials such as acetylene black, or Ketjen black), and non-electroactive metals such as cobalt, copper, nickel, other metal, or metal compound. The electron conducting material may be in the form of particles (as used here, the term includes granules, flakes, powders and the like), fibers, a mesh, sheet, or other two or three-dimensional framework. Electron conductive materials may also include oxides such as $SnO_2$, $Ti_4O_7$, $In_2O_3/SnO_2$ (ITO), $Ta_2O_5$, $WO_2$, $W_{18}O_{49}$, $CrO_2$ and $Tl_2O_3$, carbides represented by the formula MC (where M is a metal, such as WC, TiC and TaC), carbides represented by the formula $M_2C$, metal nitrides, and metallic tungsten.

The anode and/or cathode may each be associated with an electron collector. An electron collector may be electrically conductive member comprising a metal, conducting polymer, or other conducting material. The electron collector may be in the form of a sheet, mesh, rod, or other desired form. For example, an electron collector may comprise a metal such as Al, Ni, Fe, Ti, stainless steel, or other metal or alloy. The electron collector may have a protective coating to reduce corrosion, for example a protection layer comprising tungsten (W), platinum (Pt), titanium carbide (TiC), tantalum carbide (TaC), titanium oxide (for example, $Ti_4O_7$), copper phosphide ($Cu_2P_3$), nickel phosphide ($Ni_2P_3$), iron phosphide (FeP), and the like.

One or both electrodes may further include a binder. The binder may comprise one or more inert materials, for the purpose of improving the mechanical properties of the electrode, facilitating electrode manufacture or processing, or other purpose. Example binder materials include polymers, such as polyethylene, polyolefins and derivatives thereof, polyethylene oxide, acrylic polymers (including polymethacrylates), synthetic rubber, and the like. Binders may also include fluoropolymers such as polyvinylidene fluoride (PVDF), polytetrafluoroethylene (PTFE), poly(vinylidene fluoride-hexafluoropropylene) copolymers (PVDF-HFP), and the like.

A battery may further comprise a housing, and a separator between the cathode and the anode. Batteries may include one or more separators, located between the negative electrode and positive electrode for the purpose of preventing direct electrical contact (a short circuit) between the electrodes. A separator can be an ion-transmitting sheet, for example a porous sheet, film, mesh, or woven or non-woven cloth, fibrous mat (cloth), or other form. The separator is optional, and a solid electrolyte may provide a similar function. A separator may be a porous or otherwise ion-transmitting sheet, including a material such as a polymer (such as polyethylene, polypropylene, polyethylene terephthalate, methyl cellulose, or other polymer), sol-gel material, ormosil, glass, ceramic, glass-ceramic, or other material. A separator may be attached to a surface of one or both electrodes.

An example battery may further include electrical leads and appropriate packaging, for example a sealed container providing electrical contacts in electrical communication with the current collectors.

EXAMPLES

FIG. 1 shows an overcharge test result for a lithium-ion battery having a $LiNiO_2$ type cathode, an $Li_4Ti_5O_{12}$ anode, and an EMI-TFSI (1-ethyl-3-methylimidazolium-bis(trifluoromethylsulfonyl)imide) molten salt electrolyte containing a lithium ion source (Li-TFSI) at a concentration of 1.25 mol/l electrolyte. The total current was 5 C. Smoke and fire was observed during this overcharge test. In the figure, SOC is state of charge.

Figure 2:
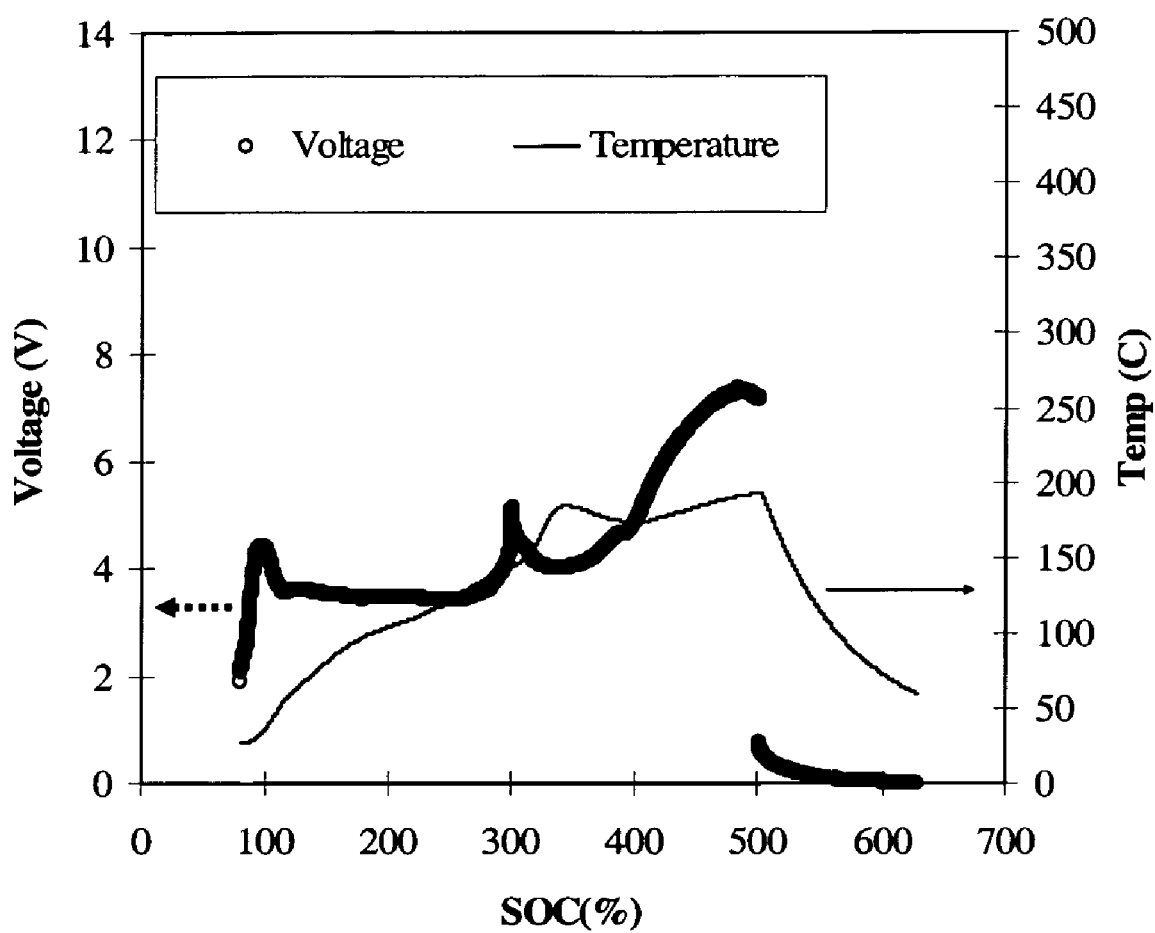
FIG. 2 shows an overcharge test result for a lithium-ion battery having an $LiFePO_4$ cathode and a molten salt electrolyte, showing enhanced stability in comparison to a $LiNiO_2$ cathode.

FIG. 2 shows an overcharge test result for a lithium-ion battery having a $LiFePO_4$ cathode, a $Li_4Ti_5O_{12}$ anode, and an EMI-TFSI Li-TFSI 1.25 mol/l electrolyte. The current was 5 C. No smoke or fire was observed, in contrast to the battery with the $LiNiO_2$ cathode, indicating that the lithium iron phosphate cathode had greater thermal stability.

Figure 3:
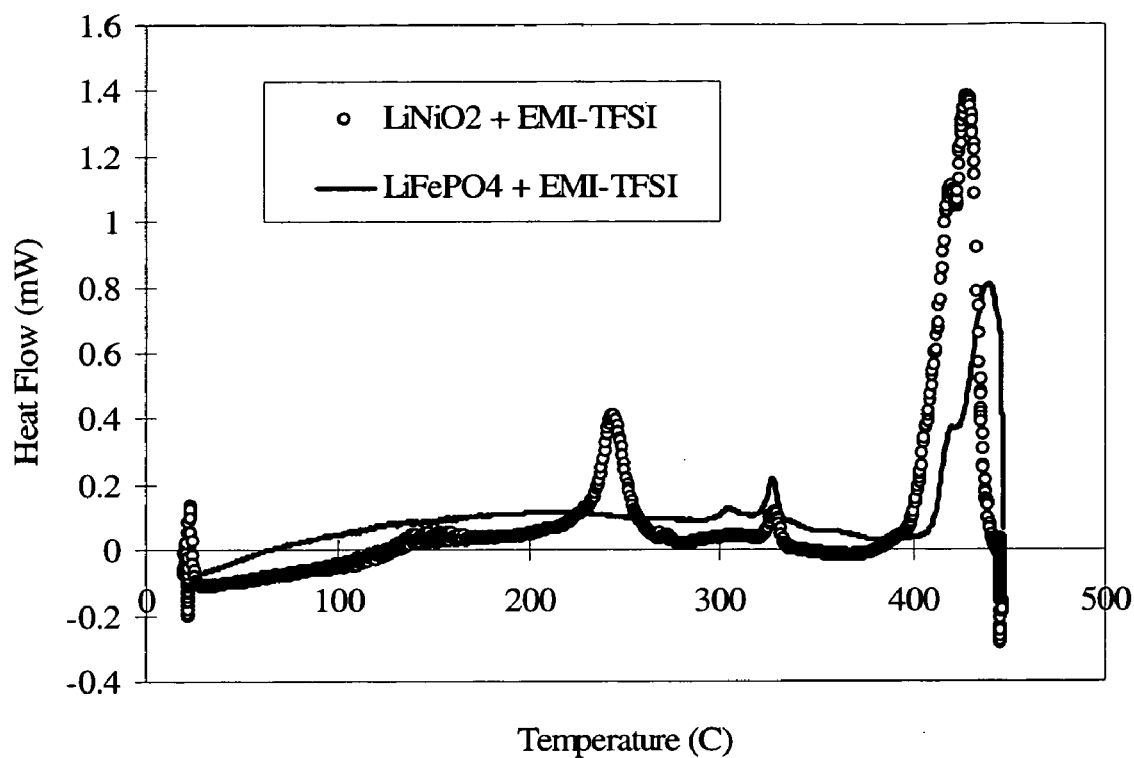
FIG. 3 shows a DSC test result for two lithium-ion batteries having molten salt electrolytes, the battery having a $LiFePO_4$ cathode having greater thermal stability than a battery having a $LiNiO_2$ cathode.

FIG. 3 shows a DSC test result for two batteries, one having the same cathode used to obtain the data of FIG. 1, the other with the $LiFePO_4$ cathode used to obtain the data of FIG. 2, other details as being described above in relation to FIGS. 1 and 2. The phosphate cathode shows less sign of decomposition, as indicated by the smaller heat flow peaks, and can be seen to have surprisingly good thermal stability when used in a lithium-ion battery having a molten salt electrolyte. Also, the use of lithium iron phosphate has cost advantages over conventional materials used in molten salt battery configurations.

Figure 4:
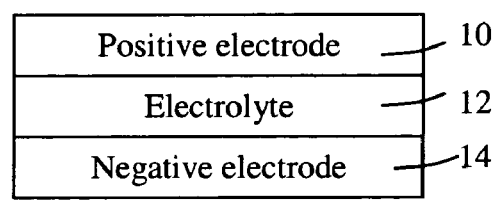
FIG. 4 shows a simplified schematic of a battery.

FIG. 4 shows a schematic of a battery comprising a positive electrode 10, electrolyte 12, and negative electrode 14, wherein in an example battery according to the present invention the electrolyte comprises a molten salt, and the positive electrode includes an electroactive compound comprising a first species such as lithium, phosphorus, oxygen, and one or more metals or semi-metals other than the first species.

Patents or publications mentioned in this specification are herein incorporated by reference to the same extent as if each individual patent or publication was specifically and individually indicated to be incorporated by reference. In particular, U.S. Provisional Patent Application Ser. No. 60/571,777, filed May 17, 2004, is incorporated herein by reference. Examples provided are not intended as limitations on the scope of the invention, which is defined by the claims. Changes therein and other uses will occur to those skilled in the art.

Having described our invention, we claim:

1. A lithium-ion battery, comprising:
   a negative electrode;
   a positive electrode; and
   an electrolyte, the electrolyte including a molten salt;
   the positive electrode comprising an electroactive compound including phosphorus, oxygen, lithium and Fluorine, and at least one other metal or semi-metal, the positive electrode thermally stable relative to a positive electrode not including the electroactive compound, the battery stable at current loads greater than 5° C. and at temperatures above 400 degrees Celsius.

2. The battery of claim 1, wherein the electrolyte includes one or more salts of lithium.

3. The lithium-ion battery of claim 1, wherein the electroactive compound is represented by the formula:

wherein $1 \leqq x \leqq 3$, $1 \leqq y \leqq 3$, and $1 \leqq z \leqq 3$, and M represents one or more metals other than lithium.

4. The lithium-ion battery of claim 3, wherein M represents one or more metals chosen from the group of metals consisting of Mg, Al, Ti, V, Cr, Mn, Fe, Co, Ni, Cu, Zn, Ga, Ge, Zr, Nb, Mo, Ag, In, Sn, Sb, La, Ce, W, and Au.

5. The lithium-ion battery of claim 3, wherein M represents one or more metals selected from the group of metals consisting of alkaline earth metals, transition metals, group 13 metals, and group 14 metals.

* * * * *